Figure 8:
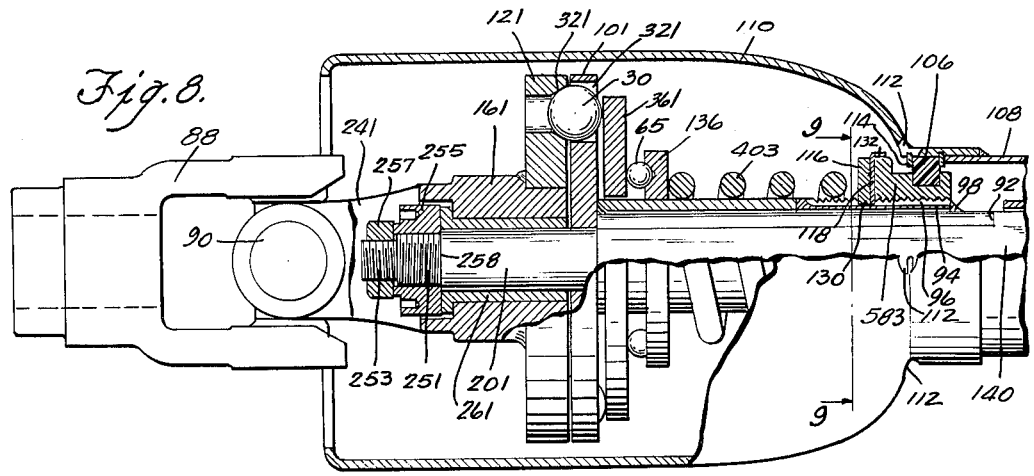

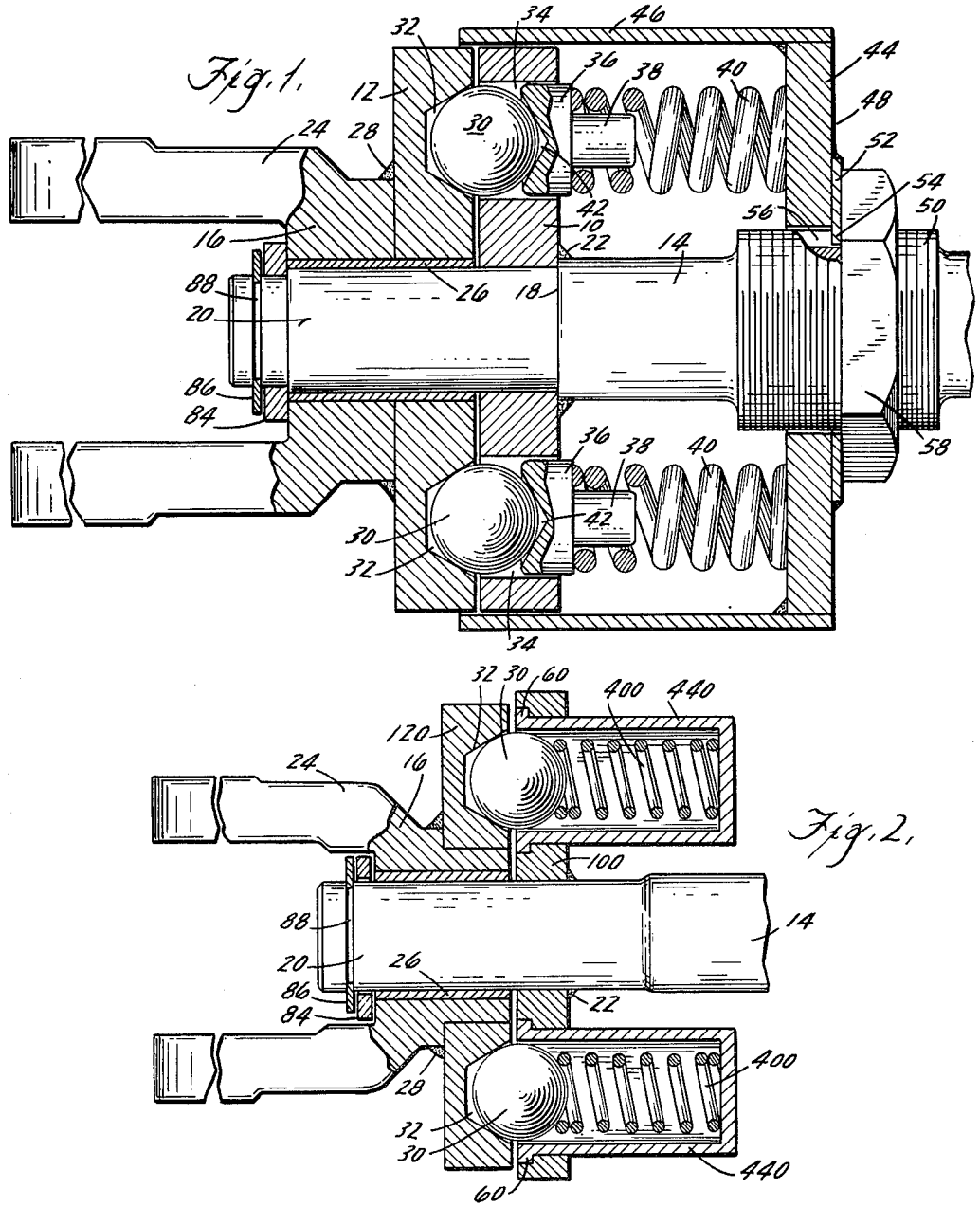

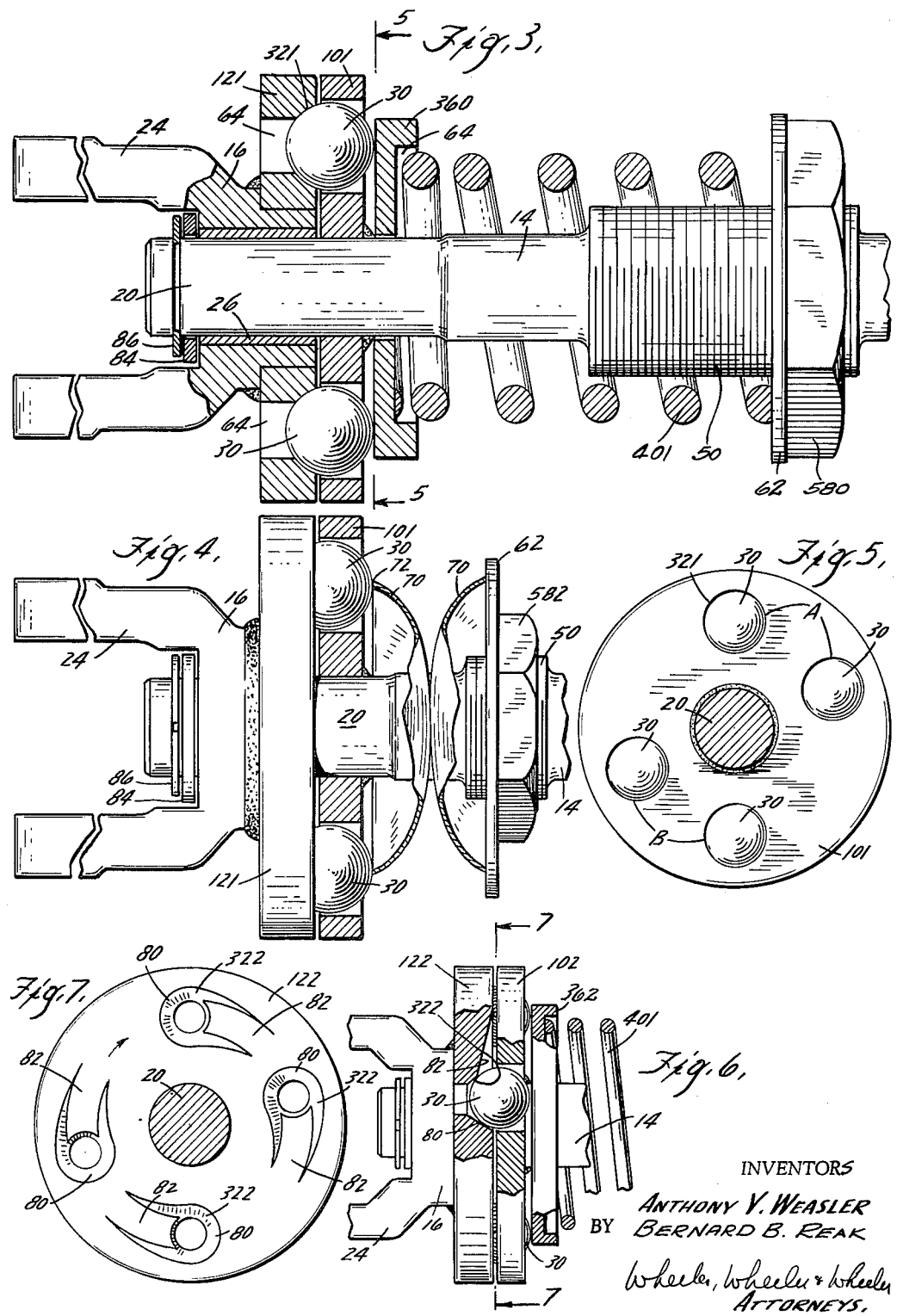

INVENTORS
ANTHONY V. WEASLER
BY BERNARD B. REAK

Wheeler, Wheeler & Wheeler
ATTORNEYS

United States Patent Office 3,252,303
Patented May 24, 1966

3,252,303
BALL TYPE TORQUE LIMITING CLUTCH
Anthony V. Weasler, 603 Ridge Road, and Bernard Bennett Reak, 823 Spring Drive, both of West Bend, Wis.
Filed Aug. 6, 1962, Ser. No. 214,997
2 Claims. (Cl. 64—29)

This invention relates to a ball type torque limiting clutch which is capable of functioning either for torque limitation or as an overrunning clutch or as a combination torque limiting and overrunning clutch.

Some of the objects of the invention are to provide a ball type torque limiting and/or overrunning clutch which is not affected by moisture, temperature or general atmospheric conditions nor by the dirt, dust or foreign materials normally encountered in power-take-off drives, the clutch preferably being one which eliminates or minimizes sliding, and uses point contact or rolling action, to the end that heating is avoided, greater horsepower can be transmitted with a more compact assembly, and torque control will be much more uniform than is possible with a slip clutch.

It is a further object of the invention to eliminate axial telescoping thrust on the shaft element under torque loading and to eliminate seizing and galling and excessive wear. It is a further purpose to provide a clutch which may be so designed that it will always come to rest with the component parts of the shaft in their original positions or at 180° therefrom. When incorporated in a universally joined shaft, this permits each joint yoke to be in proper phase at all times.

Coaxial rotors comprise relatively rotatable elements coupled by balls which are mounted in recesses of one element and normally engaged under spring bias in pockets provided by the other. The pockets preferably have tapered wall surfaces engaging the balls and tending to cam them outwardly into the recesses of the first mentioned element. However, this is not essential, since engagement of the ball below its diameter will cam the ball outwardly regardless of the form of the pocket wall. When the camming thrust exceeds the bias to which the balls are subject, relative motion between the elements will occur. We disclose a variety of means for subjecting the balls to spring bias.

In the embodiments shown in FIGS. 1 to 5, inclusive, the torque limitation is the same in both directions of rotation. In the embodiment shown in FIGS. 6 and 7, the clutch permits the parts to overrun with little torque in one relative direction of rotation, while opposing relative rotation in the opposite direction until a very substantial predetermined torque limit is achieved.

By way of exemplifying a use of the invention, we have shown a coupling between a shaft and another shaft element which may be a universal joint. In this and other installations, it is desirable to orient the coupled elements so that, following each occasion in which declutching has occurred, the balls will be engaged only in selected angular positions of the coupled elements. Thus, in the instant device, in which there may be universal joints at both ends of the shaft (the joints as such not being illustrated) it becomes desirable to permit the coupling to re-engage itself only in one of two relative positions of the coupled elements, these two positions being 180° apart. To achieve the foregoing results, we may use any desired numbers of angular series of balls. We illustrate one embodiment in which four balls are used, the four balls being positioned in pairs, the paired balls having identical spacing from each other at angles differing from the angle at which the balls are spaced within each pair.

In another imbodiment a plurality of series of balls are used at different radii, each series including paired balls. By selectively locating the pockets and the coupling balls, it is possible to control the angle of the coupled elements so that the balls will re-engage only in one position or in either of two positions or in any of three or more positions.

Figure 11:
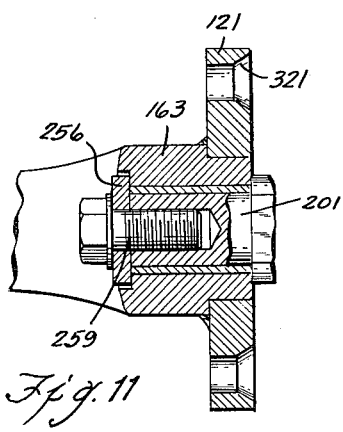
Figure 10:
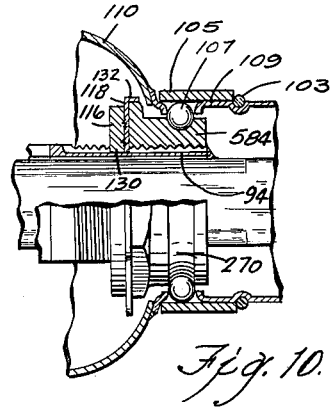
Figure 12:
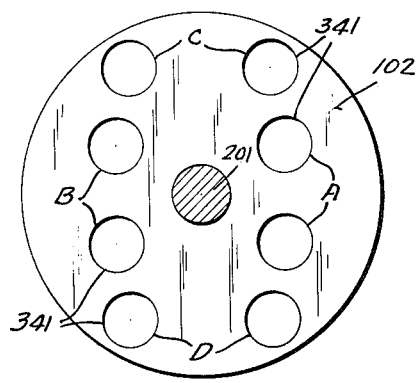
Figure 9:
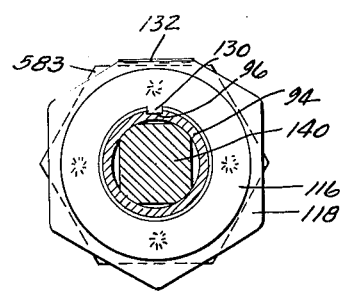

In the drawings:
FIG. 1 is a view partially in side elevation and partially in axial section through a coupling embodying the invention.
FIG. 2 is a view similar to FIG. 1 showing a modified embodiment of the invention on a somewhat reduced scale.
FIG. 3 is a view similar to FIG. 1 showing a further modified embodiment of the invention.
FIG. 4 is a view similar to FIG. 3 showing a further modified embodiment of the invention.
FIG. 5 is a view taken on the line 5—5 of FIG. 3 (or the corresponding section of FIG. 4).
FIG. 6 is a view in side elevation on a reduced scale showing a further modified embodiment of the invention including an overrunning clutch feature, portions being broken away.
FIG. 7 is a view taken on the line 7—7 of FIG. 6.
FIG. 8 is a view similar to FIG. 1 and FIG. 3 and showing a preferred embodiment of the invention.
FIG. 9 is an enlarged detail view taken in section on the line 9—9 of FIG. 8.
FIG. 10 is a fragmentary detail view showing an alternative for the guard mounting of FIG. 8.
FIG. 11 is a fragmentary detail view showing an alternative for the thrust seat of FIG. 8.
FIG. 12 is a view similar to FIG. 5 showing a plurality of series of paired balls.

The coaxial coupling elements 10 and 12 are respectively secured to aligned rotors 14 and 16. The rotor 14 is a power takeoff shaft (by way of exemplification). Optionally, it has a shoulder 18 and a reduced extremity 20 on which the coupling element 10 is mounted to abut shoulder 18. Any appropriate means such as a weld at 22 secures the coupling element 10 to the shaft 14.

The rotor 16 is the hub of universal joint yoke 24, no other parts of the universal joint being illustrated. This hub is mounted on a self-lubricating bushing 26 in which the reduced extremity 20 of shaft 14 is piloted. For convenience, the coupling element 12 is separately prefabricated and encircles the bushing 26 and is welded at 28 to the hub 16.

The coupling between elements 10 and 12 is provided by one or more balls 30. It has been found convenient to use four such balls. The coupling element 12 is provided with pockets 32 in which the several balls are normally engaged. While the form and angle of the side walls of these pockets may be varied for different purposes, it will be observed that the pockets illustrated taper frusto-conically at a 30° angle, the included angle being 60°. It will be understood that the angles are given only by way of example and not by way of limitation. The pockets may be uniformly spaced angularly or, as shown hereafter, they may be arranged in sets.

Whatever the angular spacing between the pockets, a corresponding spacing will be used in locating the ball-receiving apertures 34 of the coupling element 10. In the embodiment shown in FIG. 1, the apertures 34 are simply holes in the disklike elements 10. As a means of biasing the several balls into the pockets 32 of element 12, the FIG. 1 device uses followers 36 reciprocably guided in the holes 34 of element 10 and provided with spring-locating pins 38 for the compression springs 40. Although it is obviously not necessary to fit the followers to the balls, each follower is preferably provided with a recess at 42. As shown, the recess is conical with an included angle of 120°.

A cup-shaped housing 44 encloses and shields springs 40 and followers 36 and has a tubular side wall portion 46 which may telescopically embrace the coupled elements 10 and 12. The bottom wall portion 48 of retainer 44 is mounted on the threaded portion 50 of shaft 14 and has welded to it a disk 52 provided with a key at 54 extending into the key slot 56 of the shaft. This disk 52 also receives the thrust of an adjusting nut 58 threadedly engaged with portion 50 of the shaft and serving to adjust the bias of compression springs 40. By increasing and decreasing the bias of these springs, it is possible to vary at will the amount of torque which the device will transmit before declutching.

The angle of the side walls of the sockets 32 will also have a bearing on the amount of torque which can be transmitted before declutching occurs. Also, the depth of the sockets 32 is a factor. It will be observed that in the instant device the depth is not sufficiently great to receive the full diameter of the ball engaged in the respective socket.

When the torque predetermined by these various factors is reached, the respective balls will be cammed out of their respective sockets 32 against the bias of spring means 40, thereby accommodating relative rotation between the normally coupled elements 10 and 12 and the shaft parts 14 and 16 with which these elements are connected.

The device of FIG. 2 operates exactly like that of FIG. 1 but the torque which it can transmit is predetermined. In this instance, each of the springs 400 is provided within its own enclosing cup-shaped seat member 440, the latter being extended through the coupling element 100 and having a flange 60 countersunk into the face of element 100 to take the thrust of the spring. The torque capacity can be increased as desired by adding one or more spacers 84 to increase compression of springs 400. Since the cup-shaped element 440 extends completely through element 100, its inner surface provides guidance for the balls 30 which, in the device of FIG. 1, was guided in the bore provided by the coupling element 10.

The device of FIG. 3 also functions the same as that of FIG. 1 but in this instance a single spring means 401 is used to bias all of the several balls 30. At its rear end, the spring 401 seats upon the washer 62 fixed by the thrust adjusting nut 580. At its forward end, the spring engages a floating spring seat 360 which may be pocketed at 64 to receive the spring and has a sufficient radius to engage all of the several balls 30. The coupling element 101 is made sufficiently thin so that the balls project peripherally to receive the thrust of the spring biased member 360. This embodiment also exemplifies the fact that the ball-receiving pockets 321 may be spherical instead of frusto-conical and they may open through the coupling element 121 as indicated at 64.

The embodiment of FIG. 4 uses the same coupling elements 101 and 121 as were used in FIG. 3 but the spring means comprises any number of so-called conical springs 70 which are set back to back, the radius of the more advanced spring being sufficient to enable its margin 72 or other bearing surface thereof to be engaged directly with the several balls 30.

As shown in FIG. 5, the ball-receiving pockets 32 or 321 may be arranged in sets at any desired angular and/or radial spacing. The angular spacing between the pockets may be such that the pockets and the corresponding ball-receiving recesses of the element 10 or 101 will register in one position only or in any one of several positions. As shown in FIG. 5, the pockets are arranged in pairs A and B, being at like spacing in the respective pairs but the spacing of the pockets between pairs being different from the spacing within the pair, whereby the balls will engage to transmit motion between the coupled elements in either of two positions 180° apart. It is understood that whatever the spacing of the pockets in one of the coupled elements, the ball-receiving bores in the other element should have corresponding spacing.

The device shown in FIG. 6 and FIG. 7 differs from those previously described in that it will transmit substantial torque in one direction only and will overrun rather freely in the opposite direction of relative rotation.

The coupling element 102 and the ball-biasing spring seat 362 and spring 401 are all similar to the corresponding elements in the device of FIG. 3. However, the element 122 has its ball-receiving pockets 322 asymmetrically designed. Each such pocket is conically tapered at 80 at one side of the ball and has a very gradually inclined ramp 82 extending circumferentially of the element from the other side of the ball. Assuming that the relative direction of rotation is such as to engage the ball and conically tapered side wall portion 80 of its pocket in torque transmitting relation, then the torque transmitted will be governed by the same factors above described, namely, the angle and depth of the pocket and pressure of the biasing spring against the ball. However, if the relative rotation is opposite in direction, each ball will readily escape from its pocket by running up the gradually inclined ramp 82 at one side of the pocket, thus permitting relative movement between the coupling element under torque which may be negligible. Such a coupling will overrun rather freely in one direction of rotation but will transmit torque up to predetermined load of relatively high value in the opposite direction of relative rotation.

The construction shown in FIG. 8 is a preferred exemplification of the invention. It is particularly free of friction because of the anti-friction bearing used as part of the pressure applicator in transmitting spring pressure to the several balls.

At the left, FIG. 8 shows a complete universal joint including a yoke 88 joined by a conventional cruciform bearing or spider element 90 to the yoke 241. At the right, shaft 140 is a square shaft having its corners rounded off at the shoulder 92 to receive a threaded sleeve 94 which has a keyway at 96. The sleeve is welded to the shaft at 98. It supports a nut 583 which is used to adjust the compression of the spring 403, and it also supports, by means of a split ring nylon bearing 106, a guard tube 108 for the shaft, and a bell-shaped guard housing 110 mounted on the tube 108. Apertures 112 in the guard housing 110 gives access to a split washer 114, which is one of two split washers which retain the guard assembly on the bearing ring 106. By inserting a tool through one of the openings 112, the split ring 114 can be sprung free of its groove to permit movement of the guard with respect to the bearing ring 106.

The spring thrust washer 116 against which spring 403 seats is welded to lock washer 118. The two washers are non-rotatable, having a tongue 130 fitted in keyway 96 and positioned with lock washer 118 adjoining adjusting nut 583. Marginal portions 132 of lock washer 118 are bent over a flat side of adjusting nut 583 as shown in FIGS. 8, 9 and 10 to secure the nut against rotation from adjusted position.

The pressure applicator which applies the bias of spring 403 to the balls 30 includes, in this embodiment of the invention, a ball race 136 which confines balls 65 in face contact with the thrust member 361. Thrust member 361 bears on the clutch balls 30 to hold them in the pockets 321 of the clutch element 121.

The clutch element 121 is welded to the hub 161 of the yoke 241. The differential yoke is piloted upon the reduced extremity 201 of the shaft 140 with an intervening bushing 261 comparable to that previously described. While the assembly may be maintained by a split ring such as that shown at 86 in FIG. 1 and FIG. 3, the greater torque which this device is adapted to handle makes it desirable to use a double lock nut arrangement for resisting the thrust of the spring 403 and the balls. The successively reduced shaft portions 251 and 253 are threaded oppositely and carry oppositely threaded lock nuts 255 and 257, respectively. Nut 257 is in thrust bearing engagement with the nut 255 and the latter is solidly engaged with the shoulder 258 at the end of the threaded area 251 of the shaft. The flanged end of bushing 261 transmits axial thrust to the nut 255 thus securely fixed on the shaft.

An alternative locking arrangement is shown in FIG. 11, the differential yoke 163 being retained on the shaft portion 201 by a cap screw 259 threaded into the shaft and engaged with thrust washer 256.

An alternative anti-friction bearing support for the guard assembly is shown in FIG. 10. Instead of the split bearing ring 106 of nylon or Teflon or the like, the nut 584 shown in FIG. 10 has a ball race 270 for balls 107 for which the aperture end of guard tube 109 constitutes a cage. The cover ring 105 releasably retains the balls within the cage, thereby positioning the guard tube 109 and guard housing 110 rotatably with respect to nut 584. The retaining ring 105 may be slid axially of the guard tube when the split ring 103 is removed from its channel in the guard tube. Otherwise the structure is comparable to that shown in FIG. 8.

FIG. 12 is included to exemplify an arrangement in which there is more than one series of balls to provide releasable coupling between the parts. For transmitting exceptionally high torque the coupling element 102 shown in FIG. 12 has increased radius as compared with the element 101 of FIG. 5 to provide a second series of ball-receiving apertures 341 in pairs C and D in addition to the pairs A and B. The angular relationship between the apertures of each of the pairs C and D is the same as the angular relationship of the apertures in each of the pairs A and B. The fact that the pairs of one series are offset 90° from the pairs of the other set is immaterial as long as the complementary pockets 321 in the companion element are similary oriented.

It will be understood by those skilled in the art that the devices here disclosed are representative of many variations which can be made within the scope of the invention. Non-uniform spacing as disclosed in FIG. 5 may be used. Spring pressure may be applied directly to the balls or there may be an intervening pressure applicator subject to spring bias. Spring bias may be adjustable or fixed.

In any event, it is preferred that the coupled elements be so mounted as to provide a unitary connection between shaft parts. In the instant device, this is achieved by providing a shaft 20 with a thrust washer 84 bearing against the hub 16 and retained by split ring 86 fitted into the groove 88 at the end of the shaft. With this or some comparable arrangement, the shaft parts are as unitary as if there were no provision for torque limitation.

We claim:
1. In a ball type torque limiting clutch, a driving shaft assembly comprising
    a first shaft member including a universal joint hub with a bushing therein,
    a second shaft member having a reduced extremity piloted in said bushing and provided remote therefrom with threaded means fixed to said second member first and second coupling elements fixed to the respective shaft members and having opposing faces normal to the axis of rotation, the first said element on the first shaft member having pockets with beveled sides opening to its said face and the second said coupling element on the second shaft member comprising a disk having recesses registering with the pockets and constituting holes opening through the said second element and of a diameter exceeding the thickness of the second element balls in the recesses of the second element and projecting at both sides of the second element and normally engaged in respective pockets, the said beveled sides permitting the balls to roll from respective pockets when subjected to predetermined torque a rotatable thrust member movable axially of the second shaft member and engaged with portions of the balls projecting from the recesses in the second coupling element for holding the balls normally engaged in the pockets of the first coupling element, an anti-friction ball bearing including a ball race encircling the second shaft member and a second set of balls between said race and the thrust member, a pressure spring biasing the ball race toward said elements and subjecting the rotatable thrust member to hold the first said balls in rolling pressure engagement with the first coupling element, a seat for said spring comprising an adjusting nut threaded on the threaded means fixed to the second shaft member, a guard sleeve encircling said spring and said elements and having means for supporting it rotatably from said nut, and means for securing the said shaft members against axial separation under the bias of said spring and including nut and lock nut means on the said reduced extremity of the second shaft member, the nut being engaged with a flange with which the bushing is provided and the flange being engaged with said hub.

2. In a ball type torque limiting clutch a driving shaft assembly according to claim 1 in which the pockets and recesses of said elements are in separate series at differing radii and in pairs at like angular spacing to permit ball re-engagement only at two positions 180° apart.

References Cited by the Examiner

UNITED STATES PATENTS

| 212,382 | 2/1879 | Hughes. | |
| 865,486 | 9/1907 | Gannon | 64—29 |
| 1,007,925 | 11/1911 | Dakin. | |
| 2,164,870 | 7/1939 | De Salardi | 64—4 |
| 2,827,778 | 3/1958 | Cole et al. | 64—29 |
| 2,846,836 | 8/1958 | Ford | 64—29 |
| 2,911,803 | 11/1959 | Weasler | 64—4 |
| 2,919,562 | 1/1960 | Weasler | 64—4 |
| 2,948,173 | 8/1960 | Herrman | 64—29 |

FOREIGN PATENTS

| 1,126,848 | 7/1956 | France. |
| 846,352 | 7/1956 | Great Britain. |

BROUGHTON G. DURHAM, *Primary Examiner.*

FRANK SUSKO, ROBERT C. RIORDON, *Examiners.*

H. C. COE, *Assistant Examiner.*